United States Patent [19]

Burnham

[11] 3,892,551

[45] July 1, 1975

[54] APPARATUS FOR COUNTERCURRENT GAS-SOLID CONTACT

[75] Inventor: John S. Burnham, Denver, Colo.

[73] Assignee: The Superior Oil Company, Houston, Harris County, Tex.

[22] Filed: June 24, 1974

[21] Appl. No.: 482,493

[52] U.S. Cl. .............................. 55/390; 23/288 G
[51] Int. Cl. .......................................... B01d 53/06
[58] Field of Search ................. 55/73, 77, 79, 390; 23/288 G

[56] References Cited
UNITED STATES PATENTS

| | | | |
|---|---|---|---|
| 1,895,601 | 1/1933 | Beuthner | 55/79 |
| 2,555,129 | 5/1951 | Hagenbaumer | 23/288 G |

FOREIGN PATENTS OR APPLICATIONS

| | | | |
|---|---|---|---|
| 280,268 | 7/1927 | United Kingdom | 55/79 |

Primary Examiner—Charles N. Hart
Attorney, Agent, or Firm—Arnold, White & Durkee

[57] ABSTRACT

Apparatus for contacting a flowing gas stream with a countercurrently moving bed of granular solid material comprises an enclosed chamber having a solids entry and gas disengagement section, a solids bed section, and a solids discharge section. A plurality of baffles are disposed within the chamber and define stationary troughs each having downwardly converging side walls. The troughs are disposed in superposed relation at the bottom of the bed section, causing granular solid material to descend from trough to trough as it moves from the bed section toward a lower solids discharge section of the apparatus. The troughs cooperate to define a plurality of openings or passages through which the gas stream may flow into or out of the bed section of the chamber, as well as to achieve substantially uniform flow of the granular solid material through the bed section. The lowermost trough has a closed bottom and receives predetermined quantities of solids from the next higher or preceeding trough. The lowermost trough is movable from a first position, in which it receives the predetermined quantity of solids from the preceeding trough, to a second position where it dumps the solids into the discharge section of the chamber. The enclosed chamber is also provided with gas inlet and outlet means disposed to achieve the desired distribution and flow of gas through the solids bed section, and is provided with means for introducing solid material into the bed section and for discharging solid material from the discharge section.

19 Claims, 7 Drawing Figures

APPARATUS FOR COUNTERCURRENT GAS-SOLID CONTACT

FIELD OF THE INVENTION

The invention relates generally to apparatus for achieving gas-solid contact, and, more particularly, to apparatus for achieving substantially continuous uniform flow of granular solids through a gas-solids contact region or bed countercurrent to the flow of gas in such apparatus.

BACKGROUND OF THE INVENTION

It is often desirable to separate one gaseous component from another or to separate gas-entrained solid or liquid matter from a flowing gas stream. A number of processes and devices have been utilized in the past for contacting granular solid materials with a flowing gas stream to achieve mass or energy transfer between them. One of the practices in the past has been to pass the solid material downwardly within an enclosure having a solids inlet opening at its upper extremity and a solids discharge opening at its lower extremity. The gas then may be introduced into the lower portion of the enclosure and may be caused to flow upwardly through the enclosure, counter to the direction of particulate movement.

U.S. Pat. Nos. 1,702,311 to Pantenburg, 1,895,601 to Beuthner, 2,423,013 to Evans, and 2,780,310 to Schaub disclose countercurrent gas-solid contactor mechanisms designed particularly for purification of gases or recovering gases and vapors from gas mixtures. More recently, U.S. Pat. No. 3,708,981 to Johswich, et al., teaches specific positioning of louvers in a gas-solid contact apparatus for control of the downward movement of granular solid material during processing of polluted gas streams.

Gas purification apparatus has also been employed, as taught by the patent to Beuthner, to achieve incremental downward movement of the solid matter by selective manipulation of one or more movable grate members supporting the solid material in separated layers within the enclosure.

It is desirable to support a bed of granular solid material within an enclosure while flowing a gas steam to be treated therethrough, and to establish effective gas distribution through the bed in order to obtain good gas-solid contact for effcency of the process. It is also desirable that the solid material with which the gas stream is contacted in the enclosure be continuously replenished and discharged as the gas-solids contacting takes place in order to maintain at all times optimal conditions within the enclosure for efficiently contacting the gas stream with the solids bed.

When conventional electrical power generating facilities are operated utilizing fossil fuel, such as coal, as a source of energy, flue gases are produced that typically have a high concentration of sulfur dixode ($SO_2$). Such flue gases typically are also laden with a certain quantity of fly ash. Before the flue gases are released to the atmosphere it is desirable, and often necessary, to remove as many of the impurities as possible including most of the $SO_2$ and fly ash. By contacting the flue gas streams with naturally occurring granular sodium bicarbonate, generally referred to as Nahcolite ($NaHCO_3$), the stack gas concentrations of $SO_2$ and fly ash may be reduced to an acceptable level. Although the present invention is described particularly in relation to utilization of granular sodium bicarbonate for scrubbing $SO_2$ and fly ash from flue gases, it is not intended to limit the present invention to this particular process, it being obvious that other granular solid materials may be utilized in the contacting of gas streams for removal of gaseous, liquid, or solid constituents, for heat exchanger, or for other purposes as may be desired by appparatus constructed in accordance with the present invention without departing from its spirit or scope.

It is a primary object of the present invention to provide novel countercurrent gas-solid contacting apparatus that is capable of supporting an efficiently dimensioned bed of granular solid material for contact with a flow gas stream.

It is also an object of the present invention to provide a novel countercurrent gas-solid material contactor apparatus wherein continuous gas separation may take place and granular material for reaction with the flowing gas may be continuously fed into and removed from the gas treatment enclosure.

It is an even further object of the present invention to provide a novel gas-solid material contactor apparatus including means for supporting a bed of granular solid material in substantially static position and for selectively causing substantially uniform incremental downward movement of the granular material in the bed at a desired rate for the particular gas-solid contact process involved in order that the granular material may be discharged upon becoming substantially uniformly treated.

Among the further objects of the present invention are noted the contemplation of a novel gas-solid contactor apparatus having a facility for discharging measured quantities of heated granular solid material in a repetitive sequence which may be timed to occur at desired intervals to provide a desired mass flow of solids through the apparatus.

It is also an object of the present invention to provide a novel gas-solid countercurrent contactor apparatus that is simple, reliable in use, and low in cost. Other and further objects, advantages, and features of the present invention will become apparent to those skilled in the art upon consideration of the written specification, the attached claims, and the annexed drawings. The form of the invention, which will now be described in detail, illustrates the general principles of the invention, but it is to be understood that this detailed description is not to be taken as limiting the scope of the present invention.

SUMMARY OF THE INVENTION

The present invention is directed to the provision of apparatus for effecting gas-solid contact wherein a granular solid material flows substantially uniformly through an enclosure and a gas stream may be passed through the enclosure countercurrent to or concurrently with the solids. The apparatus may comprise an enclosure that defines a closed chamber having an upper solids entry and gas disengagement section, an intermediate solids bed section, and a lower gas entry and solids discharge section. The solids bed section includes a trough system that serves to support granular solid material in position to be contacted by a flowing gas stream. The trough mechanism also defines gas flow passages, enabling gas to flow through the enclosure countercurrent to or concurrently with the solids movement through the enclosure.

A tilting trough apparatus or mechanism is disposed below the lowermost of the superposed stationary trough structures and includes a plurality of measuring troughs, one of which may selectively be positioned immediately below the lowermost of the stationary material-directing troughs to receive granular material while the other is in a position dumping granular material into the discharge section of the enclosure. A linear fluid motor is connected through a linkage mechanism to each of the tilting trough mechanisms and is operative to shift the tilting troughs in such manner that one of the troughs is shifted to a dumping position as the other is shifted to a position in registry with the lower material-directing trough for receiving a measured quantity of the solids which flow downwardly by gravity within the enclosure.

The apparatus is also provide with a gas inlet into the enclosure below the level of the trough system and a gas outlet that is defined in the enclosure above the level of the solids bed in the enclosure. Means are provided for introducing granular solid material into the upper section of the enclosure and for maintaining the upper level of the solids bed in substantially level condition. The lower portion of the enclosure includes means for discharging the solid material from the discharge section. The apparatus for introducing and discharging the granular solid material is operative to prevent discharge of any significant amount of gas from the enclosure as the solids are being introduced or discharged.

BRIEF DESCRIPTION OF THE DRAWINGS

So that the manner in which the above recited features, advantages, and objects of the present invention, as well as others which will become apparent, are attained can be understood in detail, more particular description of the invention, briefly summarized above, may be had by reference to the preferred embodiments thereof illustrated in the appended drawings, which drawings form a part of this specification.

It is to be noted however that the appended drawings illustrate only typical embodiments of the invention and are therefore not to be considered limiting of its scope, for the invention may admit to other equally effective embodiments.

IN THE DRAWINGS

Figure 1:
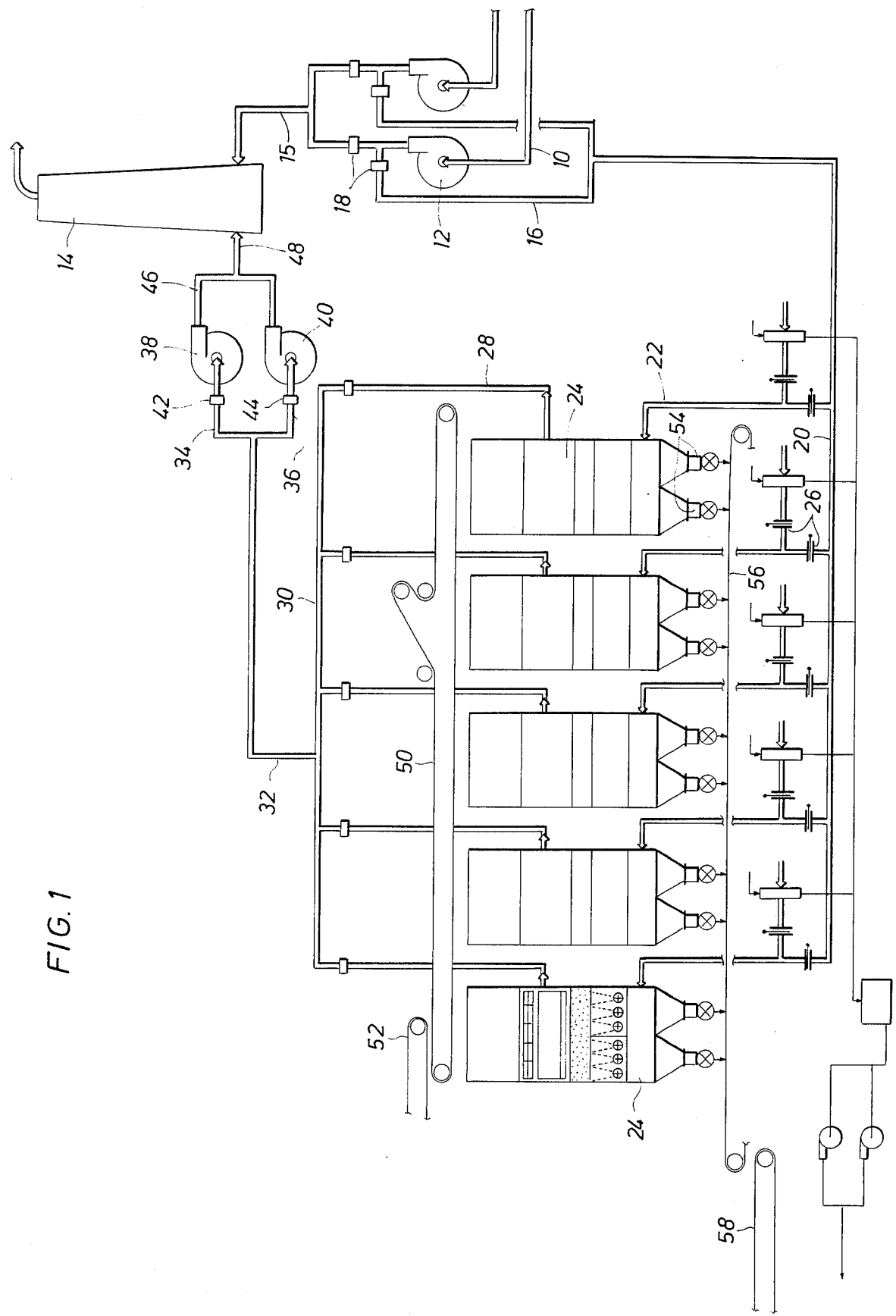

FIG. 1 is a simple partially schematic and partially structural pictorial representation of a portion of an electrical power generating facility illustrating treatment of flue gases to insure discharge of gases having low pollutant content, the gas treatment apparatus incorporating a plurality of countercurrent gas-solid contacting mechanism constructed in accordance with one embodiment of the present invention.

Figure 2:
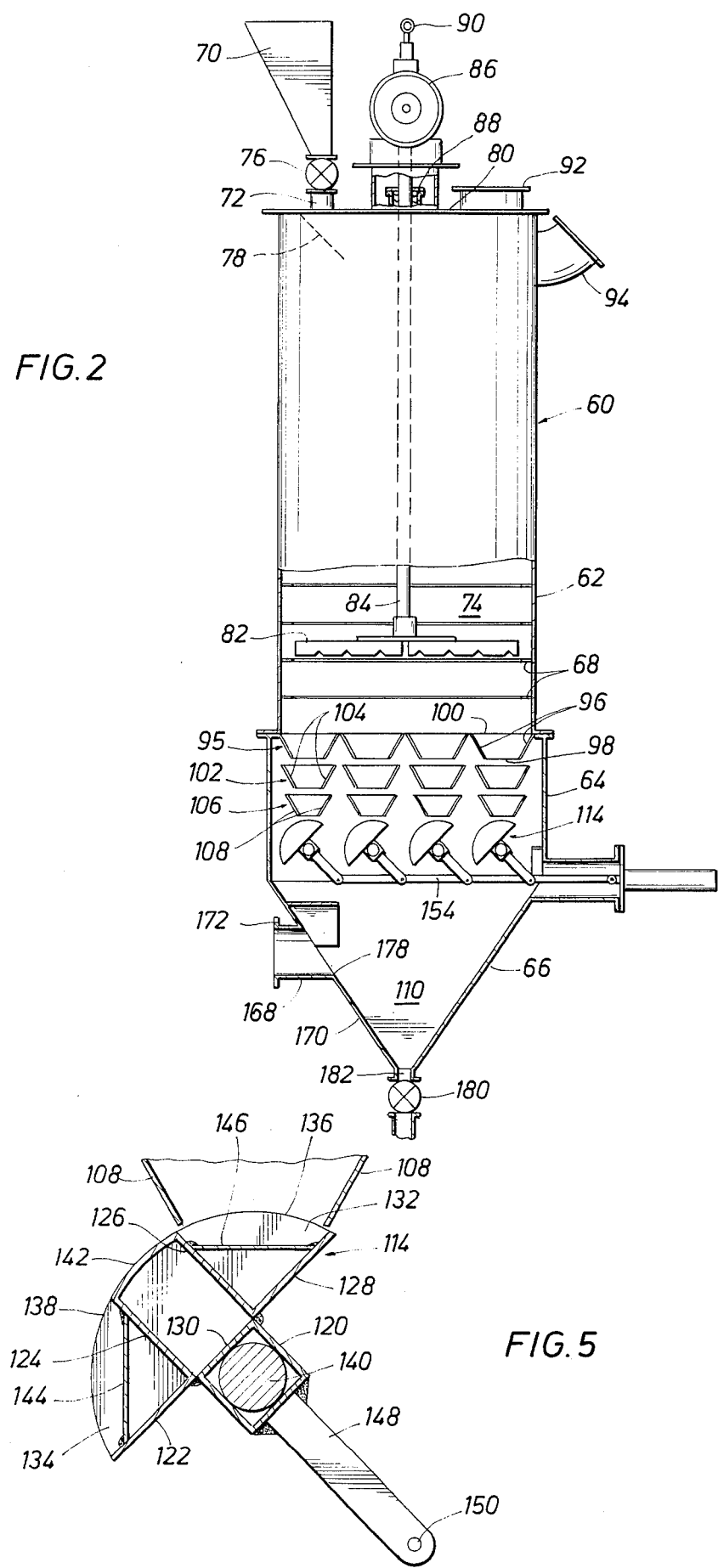

FIG. 2 is a partially cut-away elevational view of a gas-solid countercurrent contactor representing a modified embodiment of the present invention.

Figure 3:
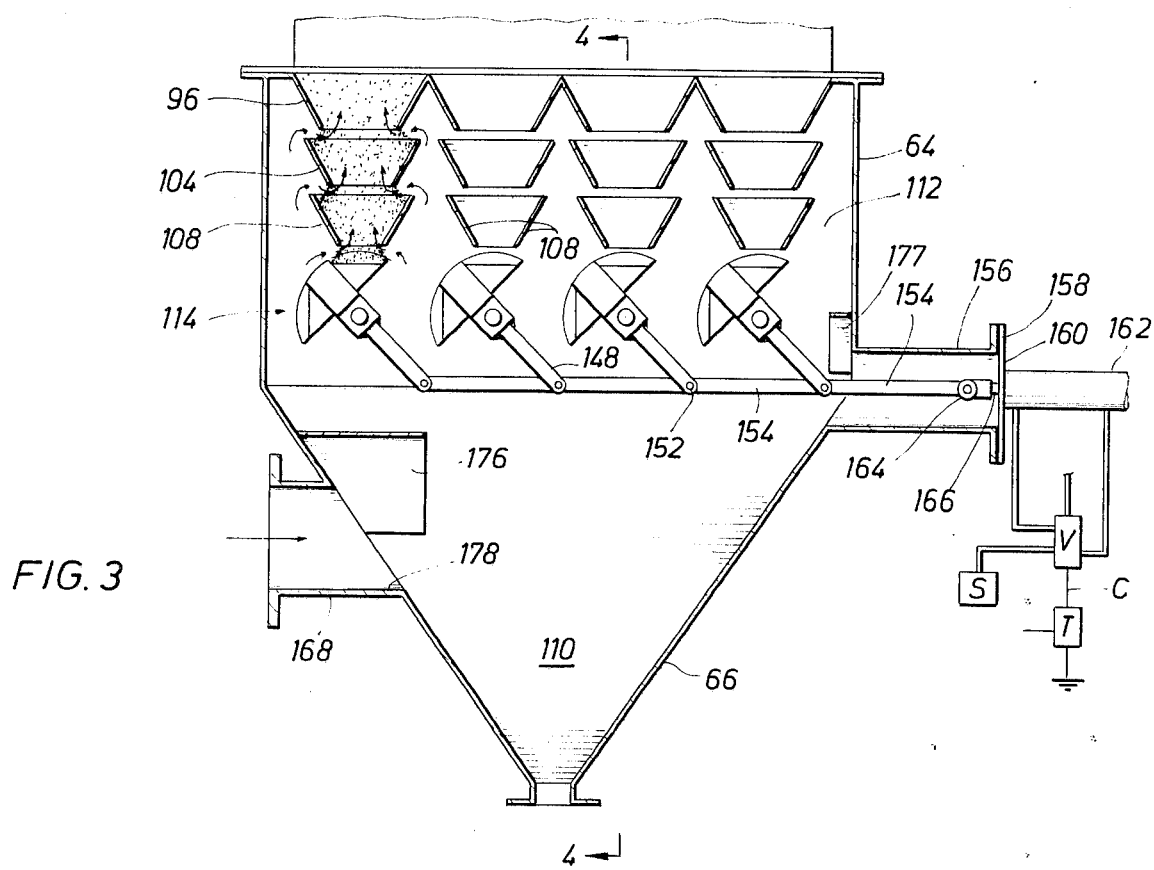

FIG. 3 is a fragmentary sectional view of the countercurrent contactor mechanism of FIG. 2 illustrating the material directing troughs and tilting trough mechanisms thereof in detail.

Figure 4:
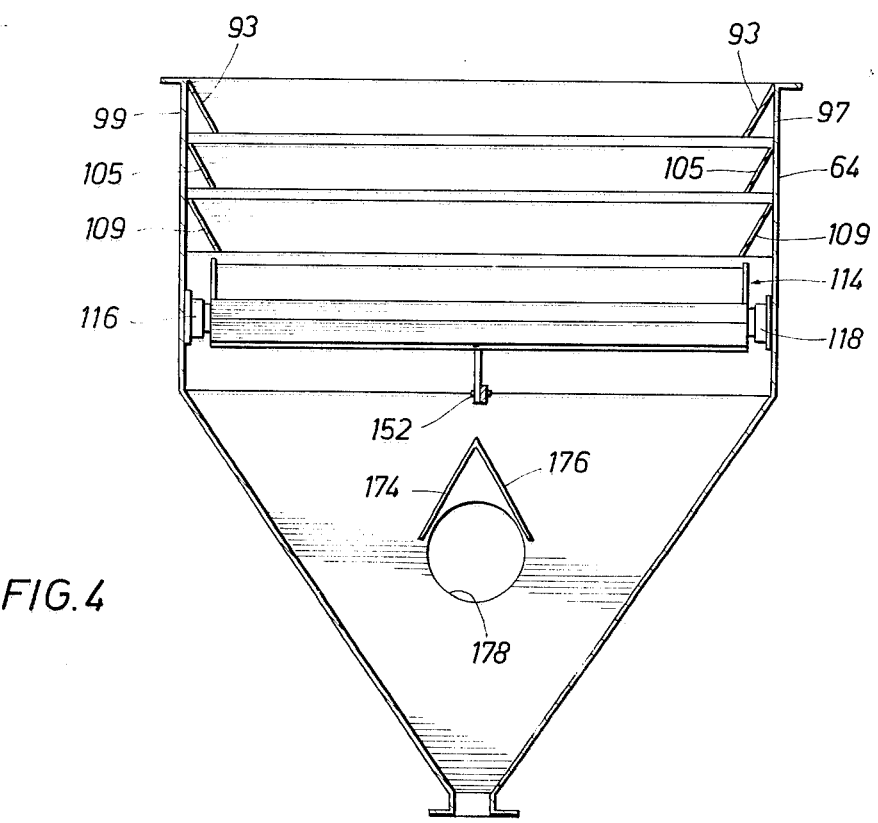

FIG. 4 is a sectional view taken along line 4—4 of FIG. 3.

FIG. 5 is a sectional view of one of the tilting trough mechanisms set forth in FIGS. 2 and 3 and illustrating the structural details thereof.

Figure 6:
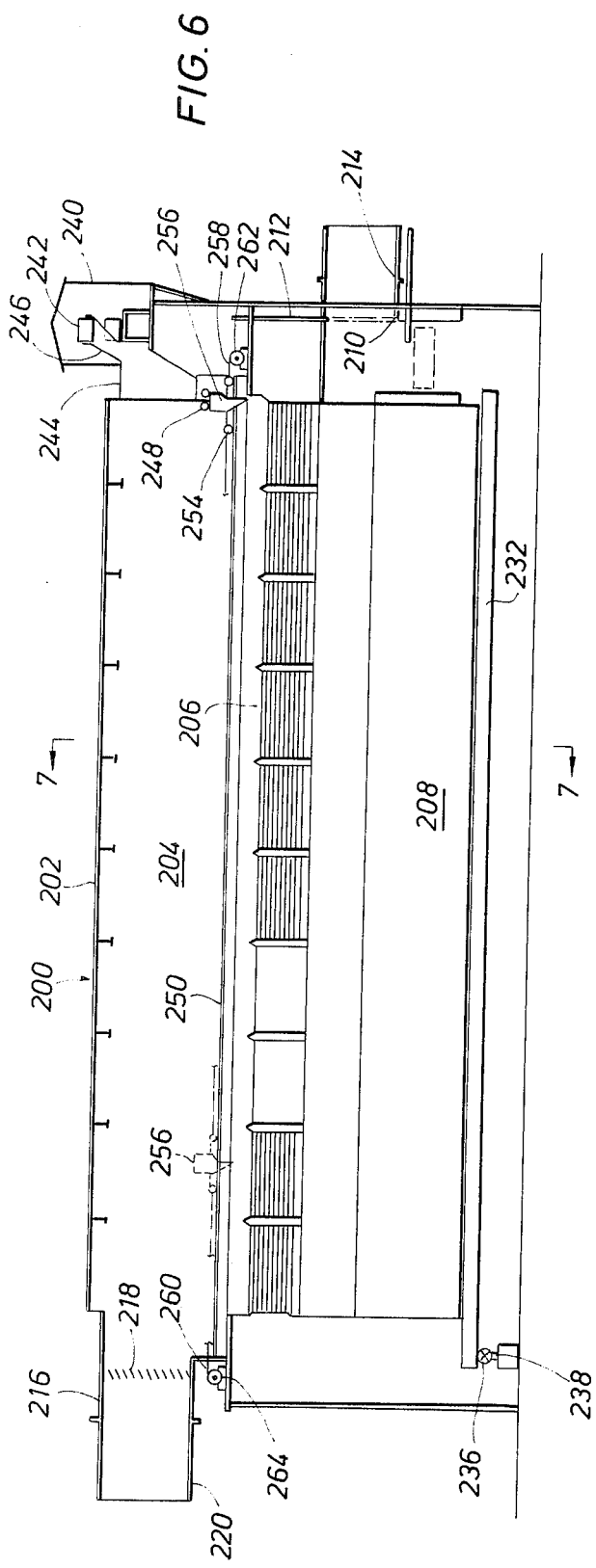

FIG. 6 is a sectional view in elevation of a gas-solid countercurrent contactor apparatus representing a further modified embodiment of the present invention.

Figure 7:
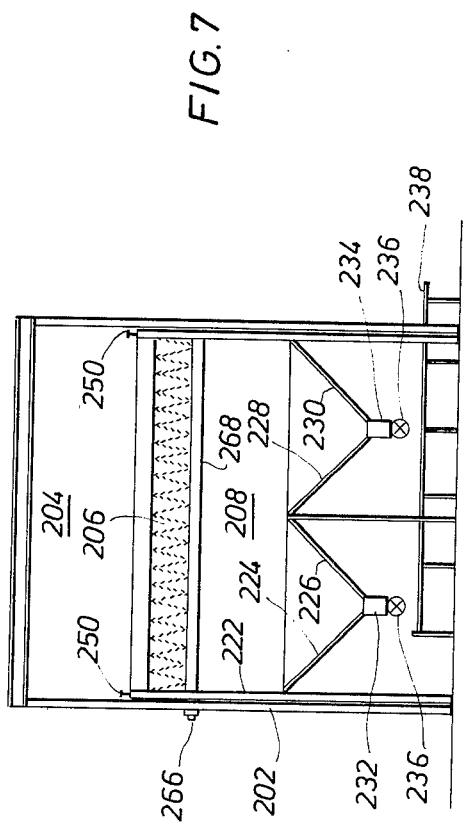

FIG. 7 is a sectional view taken along line 7—7 of FIG. 6.

DESCRIPTION OF PREFERRED EMBODIMENTS

Referring now to the drawings and first to FIG. 1, there is shown in generally schematic form a flue gas treatment facility such as might be employed in power plants where the energy source is coal or a fossil fuel having combustion properties similar to coal. The gas resulting from combustion may be conducted by exhaust conduits 10 to the suction side of industrial blowers 12 that conduct the gase either directly to a stack 14 by way of a bypass system 15 or to a gas treatment conduit 16, depending upon the position of bypass dampers 18. The gas being treated may be conducted to a gas treatment manifold 20 where it, together with other gasiform fluid, such as steam and air, may be conducted by a plurality of gas inlet conduits 22 to a plurality of countercurrent contactor gas treatment facilities 24 as may be allowed by the position of respective isolation damper mechanisms 26. The isolation damper mechanisms may be opened to allow the gas being treated to flow into all or selected ones of the countercurrent contactor mechanisms 24, or selected of the isolation dampers may be closed to optimize process conditions or to permit maintenance of the various units. It will be appreciated that the gas-solid flow relationship may be varied by changing the gas flow, the solids flow, or both, as will hereinafter be more fully discussed.

Exhaust conduits 28 may transport treated gas from the outlet openings of each of the countercurrent contactor mechanisms 24 to a manifold conduit 30 having an outlet duct 32. The outlet duct 32 communicates by ducts 34 and 36 with the section side of industrial blowers 38 and 40, respectively, under the control of damper mechanisms 42 and 44. A manifold duct 46 communicates the treated gas to the inlet duct 48 of the exhaust stack 14.

In countercurrent contactor operations for separating contaminants from flue gas, it is advantageous to employ a granulated material having the capability of adsorbing all or at least a large portion of the contaminants from the gas stream. A distribution conveyor mechanism 50 receiving granular solid gas treatment material from a supply conveyor 52 may be employed to distribute the granular solids to selected ones of the plurality of countercurrent contactor mechanisms 24. The granular solid material may be discharged from the lower portion of the countercurrent contactor mechanisms through valved outlets 54, and deposited on a discharge conveyor 56 that transports the solids output to other conveyor mechanisms 58 for transport to a disposal and/or reclamation facility of any suitable character.

Referring now to FIG. 2, a councurrent contactor gas treatment apparatus illustrated generally be reference numeral 60 may have an upper solids entry and gas disengagement section 62, an intermediate solids bed section 64 including gas distribution and solids flow control means, and a lower gas inlet and solids discharge section 66. The upper section 62 of the contactor apparatus may be of any desirable configuration and, for the purpose of the present discussion is shown to be of generally circular cross-sectional configuration in FIG. 2. The upper portion of the intermediate section 64 is a cylindrical extension of the upper section 62, having a plurality of annular rings 68 fixed in any desirable manner to the inner peripheral surface of the cylinder. The rings 68 are conventional and act to prevent channelling of gas flow along the walls of the enclosure.

A supply hopper 70 is located at the top of the upper section 62 of the countercurrent contactor apparatus 60. The hopper 70 communicates with a supply conduit 72 open to the interior of the upper section 62 by means of a gas-tight valve 76. Valve 76 allows entry of granular solid material into the apparatus without loss of significant quantities of the gas stream. A deflector plate 78 may be secured to the upper wall 80 of the contactor apparatus to initially distribute the solid material introduced through the conduit 72 fairly evenly within the chamber 74. To insure even distribution of the granular solid material across the solids bed, and to maintain the upper surface of the solids bed in generally horizontal condition, a rotatable rake mechanism 82 may be disposed within the chamber 74 for rotation by a drive shaft 84. The drive shaft 84 is in turn controlled by a drive mechanism 86 secured to the upper wall 80 of the contactor apparatus. A suitable packing assembly 88 prevents leakage of the gas through the upper wall 80 around the drive shaft 84. The drive shaft 84 may be adjustably raised and lowered as desired relative to the drive mechanism 86 simply by connection of a suitable lifiting and lowering mechanism (not shown) to the lifting eye 90 of the shaft. In the alternative, the drive mechanism 86 may also be provided with means for imparting raising and lowering movement to the shaft 84 to position the rake at the desired level within the chamber 74. In this manner the rake 82 is positioned at the approximate level of the top of the solids bed at the upper end of the intermediate bed section 64.

An inspection port 92 is provided at the upper end of the apparatus to permit visual inspection of the interior of the chamber 74. A gas outlet duct 94 may be fixed in any suitable manner, such as by welding, to the upper side wall of the upper section 62, and may be disposed in communication with suitable discharge ductwork for transporting treated gases to the base of a stack such as shown in FIG. 1.

It will be desirable to achieve uniform downward movement of the column or thickness of granular solid material which forms the solids bed within the intermediate section 64 as gas to be contacted is introduced into the lower section 66 of the contactor apparatus. It will also be desirable to maintain a minimum level of the solid granular material within the chamber as the solids move continuously downward, which may be accomplished by periodically replenishing the supply of solids through valve 76.

One suitable means for accomplishing these features may conveniently take the form illustrated in FIG. 2, where pairs of associated louvers are arranged to define a plurality of elongated superimposed fixed or stationary troughs of differing dimension, the troughs being open at both the bottom and top portions thereof in such manner as to allow granular solids to flow downwardly by gravity from trough to trough until discharged from the bottom of the lowermost open trough. As shown in FIG. 2, a plurality of open troughs 95 are defined by corresponding pairs of cooperating louvers 96 secured in the intermediate section 64. The louvers are disposed in downwardly converging relationship in such a manner as to define a lower opening 98 of smaller dimension than the upper opening 100 of the respective trough. In view of the fact that the troughs are elongated structures defined by the plate-like louvers 96 it may be desirable that at least this portion of the intermediate section 64 of the countercurrent contactor apparatus be of generally rectangular configuration. The upper edges of the respective louvers 96 abut one another or the side of the apparatus so that the open area defined by the upper openings 100 is substantially the total cross section of the apparatus and, therefore, of the solids bed supported above the louvers.

Immediately below the upper group 95 of open troughs is disposed a like number of troughs of slightly smaller dimension, illustrated generally at 102, each trough of the lowr group, receiving granular material from the corresponding trough immediately thereabove. Each of the intermediate troughs consists of a pair of downwardly converging louvers 104 secured at their respective ends to the wall structure of the intermediate section 64. The spacing of the upper extremities of the louvers 104 is substantially wider than the spacing at the bottoms of the corresponding louvers 96 immediately thereabove. Granular material descending from the upper group of open troughs 95 into the corresponding intermediate troughs fills the intermediate troughs and, at its typical angle of repose, will be effectively contained within the intermediate troughs without significant spilling over into the lower section 66. In this regard, reference is directed particularly to FIG. 3, the left side portion of which depicts the relationship of the open troughs and the material disposed therein as it seeks its angle of repose upon descending from one trough to the other.

Below the intermediate group of troughs 102 is disposed another group of troughs, illustrated generally at 106, each trough in this group being of slightly smaller dimension than the trough disposed immediately thereabove. These lowermost stationary troughs are defined by downwardly converging louvers 108 arranged in cooperating relationship one with the other to define the respective troughs and located relative to the troughs disposed immediately thereabove for receiving granular material descending by gravity. Again, the upper portions of the louvers 108 are spaced wider than the lower portions of the louvers disposed immediately thereabove in order than the granular material, seeking its angle of repose upon descent, will not overflow the upper portion of the respective troughs. It will be appreciated that the respective spacings of the various groups of louvers defining the fixed or stationary troughs may vary from the illustrated, and that the number of groups of troughs disposed in vertical relationship also may be varied as necessary to achieve the desired solids flow and convergence of streams at the outlet of the lowermost fixed troughs.

To facilitate upward flow and distribution of the gas stream from gas inlet 168 through the solids bed section 64, the spacing of the respective louvers 108, 104 and 96 produces corresponding gas-solid interfaces that allow the gas to flow into the supported column of granular solid material in the manner shown by the flow arrows in FIG. 3. Gas following the path of the flow arrows comes into efficient maximum contact with the granular solid material contained in and above the troughs, initially contacting the exposed solids in the spaces between the vertically spaced troughs. This has been found to produce good gas distribution without significant channelling. The annular rings 68 effectively prevent the gas from establishing bypass flow paths along the wall of the enclosure.

It will be desirable, for purpose of control, to vary the rate of downward movement of the granular solid material for efficient contacting with the gas stream, depending on the characteristics of the granular material being employed and the amount and nature of the pollutants that are present in the flue gas stream being treated. More importantly, it is desirable to achieve a substantially uniform solids flow as viewed across the solids bed. In other words, the solids at any given vertical height in the bed should be substantially uniformly exposed to the gas stream.

The present invention achieves substantially uniform solids flow downwardly through the gas contacting apparatus by utilization of a plurality of tilting trough mechanisms, illustrated generally at 114, that allow the granular solid material to be supported as long as is necessary for efficient utilization thereof and which may be manipulated to cause controlled incremental gravitation of the granular solid material into the discharge chamber 110. Each of the tilting trough mechanisms 114 is secured at its respective ends by pivot mechanisms 116 and 118 to the opposed walls 97 and 99 of the intermediate section 64 of the countercurrent contactor apparatus, thereby allowing the trough mechanisms to be selectively moved arcuately about the pivots to achieve control of the downward movement of the granular material. Between the pivots 116 and 118 may be supported a generally rectangular tubular element 120 to which may be welded or otherwise secured plates 122, 124, 126, and 128 in such manner as to define a pair of generally triangular troughs, the apex of each of the troughs being located at opposite corners of the rectangular tubular element 120. The plates 124 and 126, defining wall structures of each of the troughs, may be spaced by a distance equalling the width of one of the side plates 130 of the tubular element 120. End plates 132 and 134 may be secured to the opposite extremities of the respective side plates defining the troughs and the upper surfaces 136 and 138 of the end plates may be of arcuate configuration, defining an arc about the axis 140 of the pivots. A plate 142 may be interposed between the plates 124 and 126 and may have a curvature also describing an arc about the axis 140. As the tilting trough mechanism rotates between positions allowing one or the other of the trough mechanisms to be disposed immediately beneath the lowermost respective one of the stationary troughs, the arcuate plate 142 moves in close proximity to the lower portions of the respective plates 108. Transverse plates 144 and 146 may be secured between the opposed diverging plates of the respective troughs to reduce the volume of material required to fill the trough. The volume of material required to fill the trough may be varied by selecting the corresponding plate location. The plates 144 and 146 also strengthen the trough structure, permitting the use of lighter structure without the distortion that might otherwise occur.

To impart controlling movement to the tilting trough mechanism, a lever arm 148 extends from the rotatable tubular element 120 and is provided with an aperture 150 that receives a pivot 152 carried by a connecting link 154. Reciprocation of the connecting link causes arcuate movement of the lever arm 148, thus moving one of the tilting troughs about its pivots 116 and 118 from a material receiving to a dumping position. The other of the troughs is moved from its dumping position into register with the corresponding open trough.

As illustrated in FIGS. 2 and 3, the connecting link 154 is connected by a plurality of pivots to the respective lever arm structures of the corresponding tilting trough mechanisms. Simultaneous operation of the tilting trough mechanisms is achieved by reciprocation of the connecting link. The connecting link 154 is shown to extend through a tubular portion 156 of the housing structure that is appropriately flanged as shown at 158 for mating engagement with a flanged portion 160 of a linear fluid motor 162. A pivot connection is established at 164 between the connecting link 154 and the actuating stem 166 of the fluid motor, thereby allowing articulation to occur between the actuating stem of the fluid motor and the connecting link 154 as the motor imparts linear driving motion to the connecting link. When the motor 162 operates to drive the actuating stem 166 to the full outer extremity of its stroke, the connecting link 154 will cause the tilting trough mechanisms to be rotated to a position opposite that shown in FIGS. 2 and 3, at which position the other of the tilting trough mechanisms is brought into registry with the opening at the lower portion of the lowermost stationary trough assemblies, while the first trough portion of the tilting trough mechanism is moved to its dumping position, causing accumulated granular solid material to gravitate downwardly into the discharge chamber 110.

Upon movement of the linear fluid motor 162 to the opposite extremity, or the position shown in FIGS. 2 and 3, the tilting trough mechanisms will be returned to their first positions and the granular material supported by the second tilting mechanism will be dumped into the discharge chamber 110. As the opposite troughs of the tilting trough mechanism become positioned in registry with the openings defined by the lower portions of the lowermost stationary troughs, they become filled with the granular solid material to the point where the material reaches its angle of repose. The bed of granular material is, therefore, generally static except during and briefly following movement of the tilting trough mechanism.

An inlet duct 168 may be secured in any suitable manner, such as welding, bolting or the like, to the downwardly converging wall structure 170 of the lower discharge section 66 and may be appropriately flanged as shown at 172 for connection with other duct work bringing untreated gases into the countercurrent contactor mechanism. To prevent granular solid material from becoming deposited on the lower portion of the duct 68 as it falls from the tilting trough mechanisms where it would partially block the flow of gas into the chamber 110, a pair of plates 174 and 176 may be secured in any suitable manner to the wall structure 170, with the upper edges of the plates being positioned in engagement or secured one to the other by welding or the like. The angular element defined by the cooperating plates 174 and 176 effectively diverts any granular material that might otherwise fall through the opening 178, thereby maintaining the gas inlet free of any buildup of granular material. Likewise an angular element 177 of similar construction may be disposed above the opening provided for the actuator linkage 154 to prevent buildup of the granular material in the tubular structure 156 as it falls by gravity.

The flow of solids through the bed section of the apparatus is controlled by the rate at which the tilting trough mechanism is actuated and by the volume of solids discharged with each such actuation. As previously discussed, plates 144, 146 may be located at various levels in the tilting troughs to determine the volume of solids discharged. The rate at which that predetermined volume of solids is discharged is then a function of the frequency of actuation of the bluid motor 162. Of course, fresh solid granular material will be periodically added to the top of the solids bed from the feed hopper 70 to maintain the desired bed thickness.

It will be desirable to achieve discharge of spent granular solids from the discharge chamber 110 without allowing venting of gas from the apparatus. Accordingly, a gas-tight valve 180 may be connected in any suitable manner to the lower extremity of the discharge section 66 in registry with a discharge passage 182. This allows the granular solids to discharge through the valve 180 as it is actuated. The solids discharge valve 180 will be operated to avoid accumulation of solids in the discharge section 66, and in particular to prevent the soldis level in the discharge section from rising above the bottom of the gas inlet duct 168.

Where the gas to be treated is flue gas resulting from the burning of fossil fuels such as coal, and it is desired to remove the $SO_2$ and fly ash content of the flue gas, the granulated solid material introduced into the chamber 74 of the countercurrent contactor apparatus may be naturally occurring granular sodium bicarbonate (Nahcolite). The preferred thickness of the solids bed will be determined by the volume of gas flowing through the contactor, the $SO_2$ content of the gas, and the amount of $SO_2$ to be removed from the gas stream. The fly ash and other particulates in the gas stream will be effectively removed in the first few inches of solids bed and so generally will not affect the choice of bed thickness.

While three stationary trough levels are depicted in FIGS. 2 and 3, it is not intended to limit the present invention to any particular number of trough levels, it being obvious that fewer or greater number of trough levels may be dictated by the design parameters of a given gas-solid contactor apparatus.

It may be desirable to achieve timed operation of the fluid motor 162, therby causing timed sequencing of the tilting trough mechanisms 114 to allow gravitation of the granular material in such manner that the material is substantially fully spent when it finally gravitates into the discharge chamber 110 of the countercurrent contactor mechanism. One suitable means for accomplished timed actuation of the linear fluid motor 162 may conveniently take the form of a solenoid energized fluid controlled valve V that controls the supply of fluid from a source S of pressurized fluid to either side of the piston of the fluid motor. The fluid motor 162 may be of the double acting type, i.e., being hydraulically or pneumatically powered in both linear directions. Energization of the solenoid of the valve V may be controlled by an electric circuit C, the energization of which may in turn be controlled by a timer mechanism T. The timer mechanism may be of any suitable commercially available type and may be adjustable in order to achieve a timing sequence that causes operation of the tilting trough mechanisms 114 at a coordinated frequency relating to the flow characteristics and conditions of the incoming gas stream. If the characteristics of gas flow should change, such as the flow rate being increased or reduced or the $SO_2$ content of the gas changing, it may be necessary to adjust the timing mechanism T in such manner as to alter the frequency of operation of the tilting trough mechanisms 114 to increase or decrease the rate of flow of solids through the apparatus. The timing mechanism T may therefore be functional, responsive to the characteristics and conditions of flow of the incoming flue gas.

Although the present invention is discussed in connection with treatment of flue gas for removal of a major portion of the $SO_2$ and fly ash contained therein, it is not intended in any way to limit the present invention solely to such use. It will be obvious that gases other than flue gas may be treated by an adsorption process in similar manner for removal of contaminants or for separation of other gaseous matter therefrom. Similarly, apparatus in accordance with the various embodiments of the present invention may be used to transfer heat from or to the gas stream, or to otherwise treat the solids.

While the countercurrent contactor structure set forth in FIGS. 2–5 is representative of an embodiment of the invention suited for use in small scale gas-solid contact operations, the structure presented in FIGS. 2–5 is not to be considered in any way limiting of the scope of the present invention. With regard particularly to FIGS. 6 and 7, it is obvious that the same concept of courntercurrent contactor operation may be employed in a much larger scale apparatus for similar purposes. As shown in FIGS. 6 and 7, a countercurrent contactor apparatus is illustrated generally by reference numeral 200. The apparatus includes a housing 202 defining an upper section or chamber 204, an intermediate section or chamber 206 and a lower section or chamber 208. The upper section 204 may be referred to as a solids entry and gas disengagement section. The intermediate section 206 may be referred to as a solids bed contacting section, and includes the mechanism for establishing the gas-solid contact for which the apparatus is designed. The lower section 208 may be referred to as the gas inlet and solid material discharge section, and incorporates structural features for allowing inlet of gas to be treated and causing discharge of solid material.

The housing 202 of the countercurrent contactor apparatus may have a gas inlet opening 210 defined therein, opening and closure of which may be controlled by a damper 212 or other suitable value mechanism. An inlet manifold 214 may be connected to the housing structure in any suitable manner in registry with the inlet opening 210, so that gas to be treated may flow through the manifold 214 into the gas inlet and solids discharge section 208. At an extremity of the housing 202, opposite the inlet opening 210 and above the contacting section 206, a gas discharge duct 216 may be connected to the housing structure in any suitable manner. The duct 216 may include a plurality of control dampers 218 that may be manipulated or adjusted to maintain the desired gas flow conditions within the countercurrent contactor apparatus. The discharge duct 216 may be connected to other discharge duct-work 220 for transportation of treated gases to an exhaust stack or other suitable discharge means.

The intermediate gas-solids contact bed section of the countercurrent contactor apparatus 200 is located immediately above a hopper structure 222 that is positioned within the housing 202. A plurality of vertically oriented open troughs 206 are defined by cooperating louver assemblies constructed in a manner similar to that set forth at 95, 102, and 106 in FIG. 2. The troughs function to allow granulated solid material to gravitate toward the discharge chamber section 208 of the hopper 222 under control of a tilting trough mechanism constructed similarly to that illustrated at 114 in FIG. 2. The louver mechanism effectively achieve definition of upward flow paths similar in nature to those shown by flow arrows in FIG. 3. If flue gas is being treated for removal of $SO_2$ and fly ash, the granulated solid material may be sodium bicarbonate (Nahcolite) that may be maintained in a bed of suitable thickness above the louver-defined trough assemblies to achieve the desired removal of the $SO_2$ from the flue gas passing through the contact bed. Likewise, the tilting trough mechanism controlling gravitation of the granular solid material during treating the flue gas may be sequenced at a rate that will allow the solids to move downwardly through the contact bed at a desired rate and discharged into the discharge portion 208 of the housing structure.

The lower portion of the hopper structure 222 is defined by downwardly and inwardly converging pairs of walls 224, 226, 228, and 230 that cooperate to define the bottom of the hopper 222, and the sloping walls direct the discharged solids toward elongated conveyor troughs 232 and 234. The conveyor troughs are provided with any suitable conveyor mechanism for accomplishing transfer of the discharged solids toward a gas-tight discharge valve 236 that serves to exhaust the solids from the lower chamber of the countercurrent contactor apparatus to a conveyor mechanism 238 that transports the spent solid material to any suitable facility for disposal or rejuvenation as the case may be.

It will be desirable to provide means for supplying the elongated gas-solid contact bed with granular solid material for contact with the gas flowing through the countercurrent contactor apparatus. According to the present invention, such solids supply means may conveniently take the form illustrated in FIG. 6, where the housing structure 200 further includes an enclosure 240 that serves to enclose at least a portion of a supply conveyor mechanism 242. The conveyor mechanism 242 may take the form of a belt type conveyor or any other suitable conveyor mechanism capable of transporting granular solid material from a remote source to a storage hopper 244. The granular solid material descends from the conveyor 242 to the hopper 244 by means of a chute 246. The storage hopper or module 244 desirably may be of sufficient dimension to contain a supply solids that will last for a predetermined perod of time, i.e., 24 hours, thereby allowing sufficient time for repair of the conveyor mechanism 242 without necessitating shutting down operation of countercurrent contactor apparatus. At the bottom of the hopper 244 are one or more gas-tight valves 248 that, upon actuation, allow transfer of granular solid material from the hopper 244 into the upper chamber 204 of the countercurrent contactor apparatus 200 without allowing venting of significant amounts of gas to the atmosphere.

It will be desirable to achieve distribution of the granular solid material onto the contacting bed maintained above the upper trough structures of the contactor assemblies. One suitable means for accomplishing even distribution of the granular solid material is illustrated in FIGS. 6 and 7, where a pair of tracks 250 is provided to receive the wheels or guide rollers 254 or a traveling hopper 256. To opposite ends of the traveling hopper are connected cables 258 and 260 received, respectively, by cable puller mechanism 262 and 264. The cable pullers 262 and 264 are simultaneously operative in such manner that while one puller is imparting movement to the traveling hopper 256 the opposite puller merely pays out the cable and prevents the traveling hopper from overrunning as it moves along the tracks 250 and 252.

Upon movement of the traveling hoper 256 from its position in registry with the outlet port structure of the gas-tight valve 248, shown in full line in FIG. 6, to the opposite extremity of its travel, shown in broken line, the traveling hopper 256 is operative to deposit a layer of granular solid material onto the reaction bed supported by the tilting trough mechanism and by the cooperating stationary trough assemblies. For example, as the traveling hopper 256 moves from right to left it may be operative to deposit a layer in the order of one-half inch in thickness on the reaction bed and then the hopper 256 will be moved by the cable puller 262 back to its position in registry with the outlet ports of the valves where it will be refilled for the next layer application cycle. It will be appreicated that substantially uniform distribution of incoming solids over the contacting bed may be achieved by utilization of a plow mechanism operated in a manner similar to that described for the traveling hopper 256. In this embodiment, a predetermined amount of solids is dumped into chamber 204 through valve 248, and a plow mechanism is moved across the apparatus by cables 258, 260 to level the solids bed.

Operation of the tilting trough mechanism of the countercurrent contactor apparatus may be controlled in coordination with the cyclic operation of the traveling hopper mechanism 256. For example, a linear fluid motor mechanism 266 of similar nature to that illustrated and discussed in connection with FIGS. 2 and 3 may be manipulated in such manner as to impart movment to a tilting trough control linkage 268 that causes simultaneous operation of all of the tilting troughs of the countercurrent contactor apparatus. The particular volumes of granular solid material contained by the respective troughs of the tilting trough mechanisms may be such that the level of the reaction bed above the stationary troughs may be lowered approximately one-half inch. If the tilting trough mechanisms are actuated following completion of each layer applying movement of the traveling hopper 256, the level of the reaction bed of granular solid material will remain substantially constant, even though solids are continuously discharged in increments and transported away from the countercurrent contactor apparatus. Continuous operations of countercurrent contactor apparatus constructed in accordance with the present invention is effectively achieved by utilization of the various features disclosed herein.

In view of the foregoing, it is apparent that a novel countercurrent contactor apparatus has been set forth that facilitates optimum gas-solid contact to achieve any desired mass or energy transfer between a flowing gas stream and a bed of granular solid material which is adapted to gravitate incrementally downwardly through a plurality of stationary open trough mechanisms that function in combination with the tilting trough mechanism of the present invention to suport the solids bed and to achieve substantially uniform downward flow of solids therethrough. The tilting trough mechanism is movable between a first position, in which one through receives the granular solids and supports the solids bed while another trough dumps previously received solids, and a second position, in which the one trough dumps the solids while the other trough receives solids from the lowermost stationary trough and supports the solids bed.

It will be understood, of course, that although the apparatus of the present invention is particularly adapted to contacting gaseous and solid material streams in countercurrent flow, the gas flow may also be in the direction concurrent with the solids flow should such operation be found desirable. Similarly, the above discussed embodiments directed to the removal of $SO_2$ and fly ash from flue gas will be understood as exemplary, and it will be appreicated that apparatus in accordance with the present invention is suited to such other applications as separation of aerosols or other entrained liquids from a gas stream, separation of various particulates from a gas stream, carrying out of chemical reactions between the gas and solids being contacted, or accomplishing heat transfer between the gas and solid streams.

It is therefore seen that the present invention is one well adapted to attain all of the objects and advantages hereinabove set forth, together with other inherent advantages and those which will become obvious from a description of the apparatus itself. It will be understood that certain combinations and subcombinations are of utility and may be employed without reference to other features and subcombinations. This is contemplated by and within the scope of the present invention.

As many possible embodiments may be made of this invention without departing from the spirit or scope thereof, it is to be understood that all matters hereinabove set forth, or shown in the accompanying drawings, are to be interpreted as illustrative and not in any limiting sense.

What is climed is:

1. Apparatus for contacting a flowing gas with a granular solid material, said apparatus comprising:

an enclosure defining a closed chamber having a solids entry section and a solids discharge section;

a plurality of louvers mounted within said chamber and defining trough means for directing flow of solid material from said solids entry section toward said solids discharge section, said trough means defining flow passage means for gas flowing through said chamber;

receptacle means disposed within said chamber below said trough means and receiving measured quantities of granular solid material from said trough means, said receptacle means being movable from a position receiving granular solid material from said trough means to a position dumping said granular solid material into said solids discharge section;

gas inlet means being defined in said enclosure for introducing untreated gas into said chamber on one side of said trough means;

gas outlet means being defined in said enclosure on the other side of said trough means;

means for introducing granular solid material into said solids entry section; and means for discharge granular solid material from said solids discharge section.

2. Apparatus as recited in claim 1, wherein said receptacle means comprises a plurality of measuring receptacles, each of said receptacles being adapted for selective positioning beneath said trough means and selective movement to said dumping position.

3. Apparatus as recited in claim 1, wherein said trough means directs a plurality of flows of said granular solid material toward said solids discharge section and said receptacle means comprises a plurality of measuring receptacle means disposed one beneath each of said flows of granular solid material, each of said measuring receptacle means being movable from a position receiving a measured quantity of the solid material from said trough means to a position dumping said measured quantity of solid material into said solids discharge section.

4. Apparatus as recited in claim 1, wherein each of said receptacle means comprises:

an elongated element defining a pair of closed bottom troughs, said troughs being disposed in angularly oriented relation one with the other;

means pivotally mounting said elongated element within said chamber; and means imparting pivotal movement to said elongated element about said pivotal mounting means to selectively position said closed bottom troughs at said material receiving or dumping positions.

5. Apparatus as recited in claim 4, wherein said elongated element is pivotally movable about said pivotal mounting means through an arc of substantially 90°, one of said closed bottom troughs being in material receiving position relative to said trough means and the other of said closed bottom troughs being in said dumping position at one extremity of said arc of movement, and at the opposite extremity of said arc of movement the other of said closed bottom troughs being in material receiving position and said one of said closed bottom troughs in the dumping position thereof.

6. Apparatus as recited in claim 5, wherein said means imparting pivotal movement to said elongated element comprises:

lever arm means extending from said elongated element;

linear drive link means being pivotally connected to said drive link means and being operative to impart linear driving movement thereto, said elongated element being moved about said pivot upon linear movement of said drive link means.

7. Apparatus as recited in claim 3, wherein said receptacle means comprises:

an elongated element defining a pair of closed bottom troughs, said troughs being disposed in angularly oriented relation one with the other;

means pivotally mounting said elongated element within said chamber; and means imparting pivotal movement to said elongated element about said pivotal mounting means to selectively position said closed bottom troughs at said material receiving or dumping positions.

8. Apparatus as recited in claim 7, wherein said elongated elements are each pivotally movable about individual pivotal mounting means through an arc of substantially 90°, one of said closed bottom troughs of each of said elongated elements being in material receiving position relative to said trough means at one extremity of said arc of movement, and the other closed bottom trough of each of said elongated elements being in the dumping position thereof, and at the opposite extremity of said arc of movement the other of each of said closed bottom troughs of each of said elongated elements being in the material receiving position and the said one closed bottom trough of each receiving position and the said one closed bottom trough of each of said elongated elements in the dumping position thereof.

9. Apparatus as recited in claim 8, including:
   mechanical linkage means being connected to each of said receptacle means;
   linear fluid motor means being operatively connected to said linkage means and upon reciprocation thereof imparting rotary movement to said receptacle means about said pivotal mounting means; and
   means for selectively controlling energization of said linear fluid motor means.

10. Apparatus as recited in claim 9, wherein said means for selectively controlling energization of said linear fluid motor means comprises:
    a fluid supply system for said fluid motor means including a solenoid control valve; and
    electrical circuitry for controlling energization of said solenoid control valve, said electrical circuitry including timing means for causing timed sequencing of said solenoid control valve and said linear fluid motor means.

11. Apparatus as recited in claim 1, wherein said trough means comprises a plurality of superposed elongated troughs extending across said enclosure, each of said troughs having downwardly converging side walls cooperating to define upper inlet openings and lower outlet openings, said outlet openings being of smaller dimension than said inlet openings, said troughs being oriented with the inlet opening of a lower trough being disposed immediately below the outlet opening of the trough immediately above, causing material to descend by gravity from trough to trough, said side walls cooperating to define gas passage openings between said solids discharge section and said solids entry section.

12. Apparatus for countercurrent contacting of a flowing gas stream with a granular solid material stream, said apparatus comprising:
    an enclosure defining a closed chamber having a solids bed section and a solids discharge section;
    a plurality of baffle plates extending across the interior of said enclosure and defining downwardly converging side walls of a plurality of elongated troughs, said troughs having open upper inlet openings and open lower discharge openings, said inlet openings being of greater dimension than the dimension of said discharge openings, at least some of said troughs being disposed in superposed relation with the inlet openings of other of said troughs, said granular solid material descending by gravity from trough to trough, said baffle plates being oriented to define gas passages to allow gas passing through said enclosure to come into contact with said solid material supported within said troughs and within said solids bed section;
    receptacle means disposed within said chamber below said trough means and receiving measured quantities of solid material from the lowermost of said troughs, said receptacle means being movable from a position receiving solid material from one of said lowermost troughs to a position dumping said solid material into said solids discharge section;
    gas inlet means communicating between said solids discharge section and a supply of flowing gas;
    gas outlet means formed in said enclosure above the maximum level of solid material within said solids bed section and conducting said gas from said chamber;
    means for introducing solid material into said solids bed section; and
    means for discharging substantially uniformly contacted solid material from said solids discharge section.

13. Apparatus as recited in claim 12, including means for leveling the upper surface of a bed of solid material disposed within said solids bed section.

14. Apparatus as recited in claim 12, wherein said means for introducing solid material into said solids bed section of said chamber comprises:
    solid material supply means disposed at the upper end of said enclosure;
    inlet opening means defined in said enclosure; and
    gas-tight valve means interposed between said solid material supply means and said inlet opening means, said valve means, upon operating, introducing granular solid material from said supply means and preventing flow of gas from said chamber through said inlet opening means.

15. Apparatus as recited in claim 12, wherein said means for introducing solid material into said chamber comprises:
    solid material supply means disposed proximate the upper end of said enclosure;
    inlet opening means being formed in said enclosure;
    solid material feeder means disposed in communication with said inlet opening means and being operative to conduct solid material from said supply means into said chamber; and
    conveying means disposed within said chamber above the upper level of said solids bed section and operative to receive solid material from said feeder means and deposit said solid material in evenly distributed manner within said solids bed section.

16. Apparatus as recited in claim 15, wherein said conveying means comprises:
    track means disposed within said enclosure;
    traveling hopper means being received by said track means, said hopper means receiving solid material from said solid material feeder means and distributing a thin layer of said solid material upon said solids bed as said traveling hopper means traverses said track means; and
    means for imparting movement to said traveling hopper means on said track means.

17. Apparatus as recited in claim 16, wherein said means for imparting movement to said traveling hopper means comprises:

cable means extending along said track means, said traveling hopper means being connected to said cable means intermediate the extremities thereof; and cable puller means disposed at either extremity of said track means and being selectively operative to impart controlling movement to said cable means and said traveling hopper means.

18. Apparatus as recited in claim 15, wherein said conveying means comprises:

track means disposed within said enclosure;

plow means received by said track means, said plow means traversing said track means to distribute a thin layer of said solid material upon said solids bed; and means for imparting movement to said plow means on said track means.

19. Apparatus as recited in claim 18, wherein said means for imparting movement to said plow means comprises:

cable means extending along said track means, said plow means being connected to said cable means intermediate the extremites thereof; and cable puller means being disposed at either extremity of said track means and being selectively operative to impart controlling movement to said cable means and said plow means.

* * * * *